(12) United States Patent
Johnson et al.

(10) Patent No.: US 9,739,446 B2
(45) Date of Patent: Aug. 22, 2017

(54) LENS HAVING DENSELY-DISTRIBUTED CONVEX FACETS ON ITS ENTRANCE AND EXIT SURFACES

(71) Applicant: Aurora Limited, St Albans (GB)

(72) Inventors: Andrew Johnson, St Albans (GB); Ju Tang Wang, Xixiang (CN)

(73) Assignee: Aurora Limited, St Albans, Hertfordshire ( * ) Notice: Subject to any disclaimer, the term of this patent is extended or adjusted under 35 U.S.C. 154(b) by 0 days.

(21) Appl. No.: 14/759,997

(22) PCT Filed: Mar. 6, 2014

(86) PCT No.: PCT/EP2014/054405
§ 371 (c)(1),
(2) Date: Jul. 9, 2015

(87) PCT Pub. No.: WO2014/108575
PCT Pub. Date: Jul. 17, 2014

(65) Prior Publication Data
US 2015/0369450 A1    Dec. 24, 2015

(30) Foreign Application Priority Data

Jan. 10, 2013 (CN) .................... 2013 2 0018512 U
Mar. 6, 2013 (WO) ................ PCT/GB2013/050541
(Continued)

(51) Int. Cl.
*F21V 5/04* (2006.01)
*F21V 5/00* (2015.01)
(Continued)

(52) U.S. Cl.
CPC ................ *F21V 5/045* (2013.01); *F21K 9/23* (2016.08); *F21K 9/60* (2016.08); *F21S 8/02* (2013.01);
(Continued)

(58) Field of Classification Search
CPC . F21V 5/045; F21V 7/09; F21V 7/041; F21V 7/048; G02B 3/08; G02B 19/0028
See application file for complete search history.

(56) References Cited

U.S. PATENT DOCUMENTS

| 8,746,935 B2 * | 6/2014 | Popper | F21V 5/04 362/311.06 |
| 2005/0281034 A1 * | 12/2005 | Summerford | F21V 5/02 362/304 |

(Continued)

*Primary Examiner* — Karabi Guharay

(57) ABSTRACT

Optical lens (3) for a LED comprising a lens body (10) having: —a light-entering section (1), where light from the LED enters the lens (3), having a cross-sectional dimension (D2) and recessed to accommodate a LED; —a light-emitting front face (2); —a frusto-conical shape (4), extending along a central axis between the light-entering section (1) and the light-emitting front face (2), the outer surface of which incorporating a plurality of densely-distributed convex facets (24); —a height (H) along said central axis; —a cross-sectional width (D1) at the level of the light-emitting front face (2). This optical lens enhances light utilization efficiency, avoids creating spots with chromatic aberration hence greatly improves color rendering.

24 Claims, 7 Drawing Sheets

(30) Foreign Application Priority Data

Oct. 8, 2013 (GB) .................................. 1317750.6
Oct. 16, 2013 (GB) .................................. 1318343.9

(51) Int. Cl.
| | |
|---|---|
| *F21V 29/70* | (2015.01) |
| *F21V 23/00* | (2015.01) |
| *G02B 3/08* | (2006.01) |
| *G02B 19/00* | (2006.01) |
| *F21S 8/02* | (2006.01) |
| *F21V 7/00* | (2006.01) |
| *F21V 17/10* | (2006.01) |
| *F21K 9/23* | (2016.01) |
| *F21K 9/60* | (2016.01) |
| *F21K 9/00* | (2016.01) |
| *F21V 29/00* | (2015.01) |
| *F21V 7/04* | (2006.01) |
| *F21V 29/89* | (2015.01) |
| *F21Y 101/00* | (2016.01) |

(52) U.S. Cl.
CPC ................ *F21V 5/007* (2013.01); *F21V 5/04* (2013.01); *F21V 7/00* (2013.01); *F21V 7/0091* (2013.01); *F21V 17/10* (2013.01); *F21V 23/001* (2013.01); *F21V 23/005* (2013.01); *F21V 29/70* (2015.01); *G02B 3/08* (2013.01); *G02B 19/0028* (2013.01); *G02B 19/0061* (2013.01); *F21K 9/00* (2013.01); *F21V 7/048* (2013.01); *F21V 29/20* (2013.01); *F21V 29/89* (2015.01); *F21Y 2101/00* (2013.01)

(56) References Cited

U.S. PATENT DOCUMENTS

2009/0040770 A1* 2/2009 Lo ........................ F21V 7/041
362/327
2011/0170298 A1* 7/2011 Anaokar ................ F21S 8/02
362/297

* cited by examiner

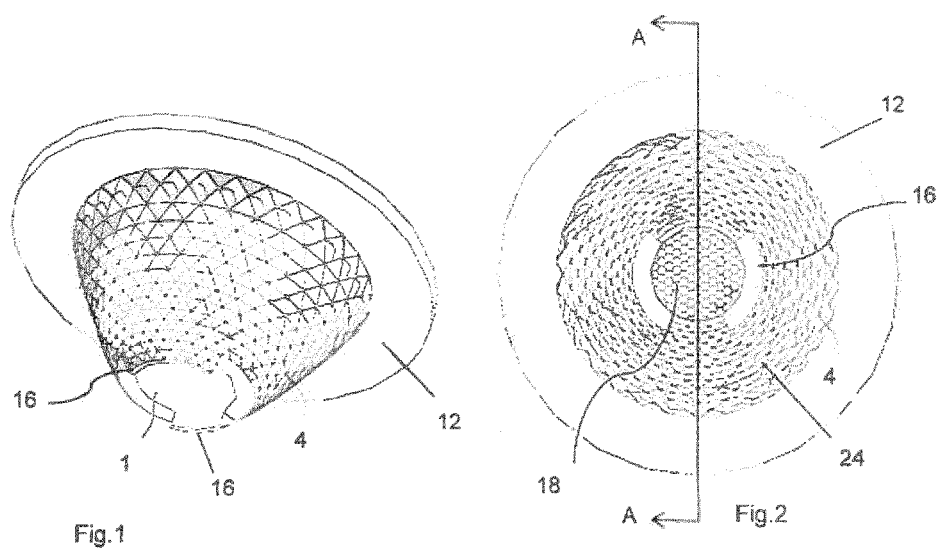
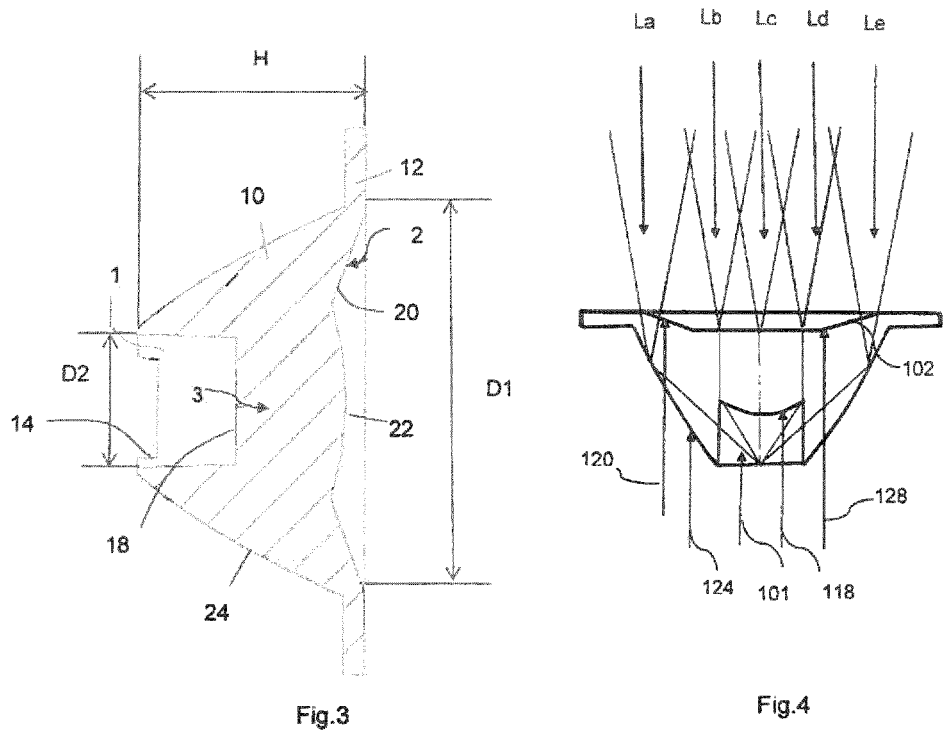
Fig.1 Fig.2 Fig.3 Fig.4

LENS HAVING DENSELY-DISTRIBUTED CONVEX FACETS ON ITS ENTRANCE AND EXIT SURFACES

FIELD OF THE INVENTION

The present invention relates to a new type of lens, in particular, but not exclusively, for use with an LED luminaire having an LED integrated light source, and to LED lighting units, including downlights, incorporating these new lenses.

BACKGROUND TO THE INVENTION

An LED integrated light source lens contributes to boosting the surface luminous efficiency of an LED integrated light source. An LED integrated light source lens of the known kind, comprising a light entering section in the shape of a hole or recess and of a light emitting section in the shape of a cup, has smooth surfaces on both the light entering and emitting sections. This has as a disadvantage that light utilisation efficiency of the LED integrated light source is very poor. A further disadvantage is that this arrangement creates luminous spots with obvious colour aberration, that is the colour rendering index is adversely affected.

SUMMARY OF THE INVENTION

According to a first aspect of the present invention there is provided an optical lens for an LED integrated light source including an LED light engine, said lens comprising:—
 (i) a lens body having a base where light from the LED light engine can enter the lens, and a light emitting front face, the lens body having a substantially frusto-conical shape having a central vertical axis extending from the base through the light emitting front face, said lens body having a height H between a bottom plane of the base and a front of the light emitting front face, and a cross-sectional dimension D1 across the front of the light emitting front face;
 (ii) a light entering section recessed in the base of the lens body adapted to accommodate an LED light engine, the light entering section having a cross-sectional dimension D2;
 (iii) the outer surface of the frusto-conical lens body between the base and the light emitting front face incorporating a plurality of densely distributed convex facets;
wherein light from the LED light engine is focussed into a light beam between 15 degrees and 60 degrees about the central vertical axis, and wherein the ratio of D1 to H is equal to or greater than 1.90 and wherein D2 is no greater than 15 mm.

In the present description the lenses are described having an orientation as shown for example in FIG. 3 in which the left hand side as shown in the Figure is described as the base or rear of the lens and the right hand side as the front or upper part. The use of terms such as "front", "upper", "rear" or "base" are to be considered in this context and it will be understood that, in use, the lenses may be used in differing orientations.

The measurement of the lens diameter D1 excludes any flange which might be present around the outer edge of the light emitting front face of the lens, since light is not emitted through the flange. The height H is taken from the uppermost point of the light emitting front face, which is usually around the edge of that face, to the bottom of the base of the lens.

Using a higher density of reflective facets on the outer curved conical surface of the lens body than in previous lenses of this type results in enhanced light utilisation efficiency, creates spot lights with no significant colour aberration, and greatly improves the colour rendering index.

Preferably the ratio of D1 to H is between 1.90 and 4.00, and more preferably the ratio of D1 to H is between 1.90 and 3.81. A further advantage is that such a lens is relatively squat allowing for the use of LED light sources together with such a lens in new applications. For example, this enables compact lenses to be produced which in turn enables production of LED lamps which are an equivalent size and brightness to conventional halogen lamps (bulbs), and thus may be used as direct LED replacements for halogen lamps. This in turn provides a significant saving in energy usage.

Preferably the average density of the densely distributed convex facets on the outer surface of the frusto-conical lens body between the base and the light emitting front face is greater than 14 facets per square centimeter (psc), and more preferably between 14 and 85 facets per square centimeter.

In particularly preferred embodiments the number of densely distributed convex facets on the outer surface of the frusto-conical lens body between the base and the light emitting front face is greater than 500 facets per conical surface (pcs), and is more preferably greater than or equal to 600 facets per conical surface.

Preferably the light entering section in the base of the lens body comprises a blind recess which is preferably substantially circular in cross-section.

Preferably the base of the blind recess incorporates a refractive surface, which may take the form of a plurality of substantially convex facets. These small convex lenses are adapted to diffuse or spread light emitted from the LED light engine and create a multi-point light source. In the context of this description, the term 'plurality' means one or more. The blind recess may therefore incorporate one light scattering or light divergent convex lens and this lens may have a plurality of different curvatures over its surface.

Preferably the densely distributed convex facets on the outer surface of the lens body are adapted to reflect light from the LED light engine out of the light emitting front face of the lens body.

Preferably the lens further comprises a flange extending outwardly substantially around a perimeter of the light emitting front face of the lens body.

Preferably the body of the lens is substantially solid, and is preferably formed from a substantially transparent or translucent plastics material.

Alternatively the lens body may be formed from glass.

In a further preferred embodiment the light emitting front face of the lens body incorporates a recess, such that the light emitting front face of the lens body is substantially concave.

Preferably the light emitting front face of the lens body incorporates both concave and convex regions. These curved surfaces affect the beam angle of the emitted light.

Preferably part or all of the light emitting front face of the lens body incorporates a refractive surface, which may take the form of a plurality of substantially convex facets.

Preferably the base of the lens body incorporates a plurality of cut away portions adapted to accommodate wires supplying electricity to the LED light engine.

In summary, an LED integrated light source lens comprising a light entering section in the shape of a hole, a light emitting section in the shape of a cup, is disclosed incorporating an optical lens positioned between the light entering section and the light emitting section, wherein the external surfaces of the light entering and emitting sections include portions having densely distributed convex facets.

Preferably, the optical lens has a spotted surface on one side.

Preferably, the optical lens has a curved surface on the other side.

Preferably, the curved surface is convex.

Preferably, the hole is provided with a non-spherical surface at its base.

The densely distributed convex facets on the external surfaces of the light entering and emitting sections cause the LED integrated light source to emit multi-point lights, which enhances light utilisation efficiency, creates no spot lights with colour aberration, this in turn greatly improves the colour rendering index. The side of the optical lens having a spotted surface creates multi-point lights. The other side of the optical lens, having a curved surface, changes the light beam angle.

The present invention also extends to include a lamp comprising a lamp holder, a solid state lighting element, an LED driver, a heat sink, and an optical lens as described herein.

BRIEF DESCRIPTION OF THE DRAWINGS

The invention will now be described, by way of example only, in relation to the attached Figures, in which FIG. 1 shows a schematic perspective view of a first embodiment of a lens according to the present invention;

FIG. 2 shows a view from below of the lens of FIG. 1;

FIG. 3 shows a section along line A-A of FIG. 2;

FIG. 4 shows a section similar to that of FIG. 3 showing schematically the flow of light through the lens;

DESCRIPTION OF PREFERRED EMBODIMENTS

Figure 5:
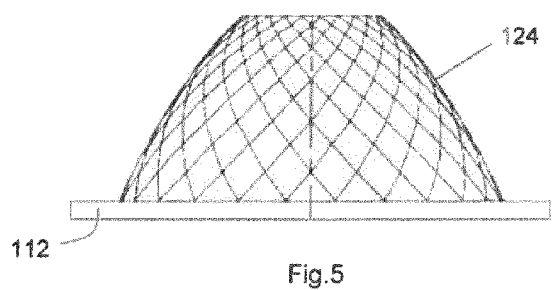
FIG. 5 shows a side view of a second embodiment of a lens according to the present invention.
Figure 6:
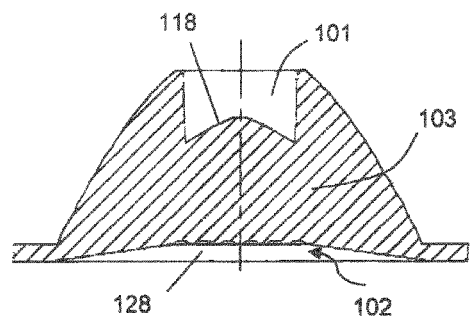
FIG. 6 shows a section along line A-A of FIG. 5.
Figure 7:
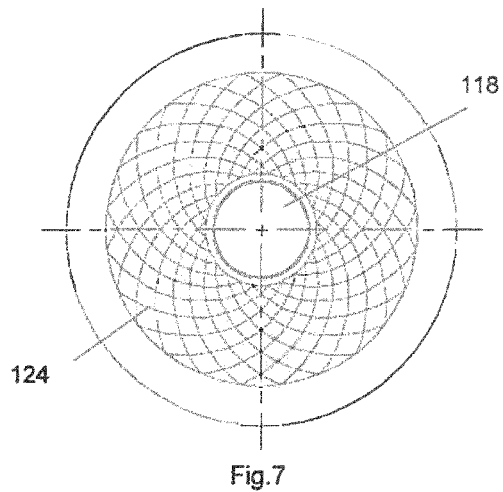
FIG. 7 shows a view from below of FIG. 5.
Figure 8:
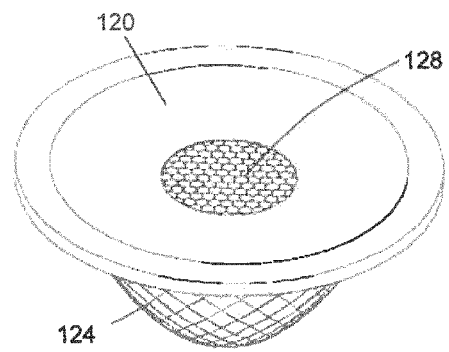
FIG. 8 shows a perspective view of the front of FIG. 5.

Referring first to FIGS. 1 to 3, the lens can be seen to comprise a substantially solid lens body 10 having a generally conical or frusto-conical portion 4 provided with a flange 12 extending thereabout providing a circular periphery to the lens. The flange 12 is an optional feature and, as will be seen below, is not essential for the lens to perform its function. The conical or frusto-conical portion 4 extends from the circular flange 12. The side of the flange 12 from which the conical or frusto-conical portion 4 extends will be referred to as the bottom, base or rear side and reference to an 'upper side', a 'front side', 'above' or 'below' should be interpreted accordingly.

The lens has a central vertical axis extending generally along a line from D2 to D1 in FIG. 3. The lens is formed from a transparent or translucent material. In the case of a transparent or translucent plastics material, the lens is preferably formed by injection moulding.

A base of the conical or frusto-conical portion 4 is provided with a recess or hole provided therein. The hole is in the form of a blind recess. As may be seen from the figures the recess is typically substantially circular in section, though other sections may be used. The side or sides of the recess are substantially aligned with the central vertical axis of the lens.

The base of the conical or frusto-conical portion 4 is provided with two cut away portions 14 extending along a portion of a circumference of the conical or frusto-conical base portion 4 to create two tabs 16 extending in between. These cut away portions or tabs are adapted to accommodate wires supplying electricity to the LED light engine. From FIG. 2, it can be seen that the lens is substantially symmetric about a central plane.

In use, an LED (LED light engine) is located at the opening of the hole in the base of the conical or frusto-conical portion 4, such that the hole forms a light entering section 1 of the lens. The end of the blind recess or base of the hole may be provided with a refractive surface 18, for example a spotted or dimpled surface made up of a series of facets. In this embodiment the refractive surface 18 is substantially circular in shape and has a diameter D2. From FIG. 2 it can be seen that this refractive surface takes the form of a plurality of substantially hexagonal convex facets formed on the surface of the base of the hole. In use, the refractive surface 18 creates multi-point light beams. In this embodiment the refractive surface 18 is located on a generally level plane, substantially perpendicular to the central vertical axis of the lens.

The external surface of the conical or frusto-conical portion 4 is provided with a network of densely distributed convex facets 24. In use, these facets 24 create multi-point light beams by total internal reflection. The facets 24 of this embodiment can be seen to be generally triangular or diamond shape in outline. The outer surface of each triangle/diamond is convex in shape, causing light rays from the LED light source to be reflected out of the front of the lens by total internal reflection. It will be appreciated that the angle of curvature of these convex reflecting facets can be varied by the designer to achieve the desired beam angle for a particular lens. For a given and fixed set of dimensions for D1, H and D2 the beam angle of the lens can be varied between 60 degrees and 15 degrees by adjusting the angle of curvature of the reflecting facets.

It can be seen from FIGS. 2 and 3 that the density of facets, that is the number of facets per square centimeter on the outside of the conical part of the lens, increases towards the light entering section or the base of the lens. This, as well as the overall average density of the facets, is an important feature of this lens design. Examples for average facet densities are given in the table below. Each facet is preferably greater than 1 square millimeter in surface area. Facets smaller than this are difficult to manufacture with the necessary degree of accuracy required to achieve the desired beam angles and optical efficiency. As a general rule, the uniformity of the light distribution of a lens according to the present invention is relative to the size of facets; the smaller facets the more uniform the light distribution.

An external surface of the light entering section 1 can thus be seen to be provided with convex facets 24 on the reflective surface of the conical or frusto-conical portion 4 and convex facets on the refractive surface 18. Computer programs are commercially available that enable modelling of the propagation of light and optimisation of design criteria. An example of one such program is TracePro, sold by Lambda Research Corporation of 25 Porter Road Littleton, Mass. 01460, USA.

Importantly, light from the LED light engine is focussed in the present lenses into a light beam between 15 degrees and 60 degrees about the central vertical axis with an efficiency of about 88% or above. Achieving such a narrow beam angle with high efficiency and with a D1:H ratio of 1.9 or above has not previously been possible.

As can be seen from FIG. 3, the front of the lens is provided with a shaped recess. The shaped recess is in the shape of a cup, being generally concave, comprising an inclined surface 20 extending inwardly from the front face of the lens, the inclined surface 20 meeting a generally circular base 22 of the cup shape, the base 22 being substantially convex in shape. The curved convex shape is used to change the light beam angle. The generally circular base 22 is provided with a network of refractive surfaces in the form of densely distributed convex facets. The inclined surface is preferably substantially concave.

In use, the shaped recess forms a light emitting front face or section 2 of the lens. It should be emphasised that a refractive surface may be present on either the base of the light entering section 1, or on the front face of the lens, or both, as required by the desired performance characteristics of the lens.

The portion of the lens between the hole and the shaped recess forms an optical body or lens 3 positioned between the front face and the base of the lens body.

It will be understood that the light entering section 1, the light emitting section 2 and the optical lens 3 are preferably formed as a unitary or one piece body from transparent/translucent material.

With reference to FIG. 3, it can be seen that a height H can be measured between the left hand most side of the lens, that is the bottom plane of the base and the right hand most side of the lens, that is the front of the light emitting front face. Similarly, the light emitting front face or section 2 can be seen to have a cross sectional dimension, or diameter, D1 across its front. The light entering section can also be seen to include a cross sectional dimension D2. A preferred ratio for D2:H:D1 is 1:2:4. This ratio, or a ratio close to this one, provides lens having an optimum range of beam angles and is applicable to all the lenses exemplified herein.

FIGS. 5 to 8 show a second embodiment of a lens in accordance with the present invention. It is noted that this embodiment (and those following) do not feature the cut away portions at the narrow end or base of the conical or frusto-conical portion. Also, the hole or blind recess is circular in section with a convex blind end 118. This convex blind end may incorporate a range of curvatures in order to minimise the amount light from the LED light engine which leaves the lens without being either refracted or reflected or both, as described in relation to FIG. 4 below.

This embodiment (and those following) is further distinguished by the pattern of the network of reflective convex facets on the outer surface of the lens.

Similar reference numerals are used to refer to similar aspects of the invention. Thus, a conical or frusto-conical portion of a lens is provided with a flange 112. A light entering section 101 includes an outer surface of the conical or frusto-conical portion provided with a network of reflective surfaces 124 and a non-spherical base surface 118 provided at rear surface of the lens. The reflective surfaces 124 are generally diamond shaped. A generally concave light emitting section 102 comprises an inclined surface 120 extending inwardly from the front face of the lens, the inclined surface 120 meeting a generally circular base, the base being provided with a network of refractive surfaces 128. In this embodiment (and those following) the base is generally planar. An optic lens 103 is defined between the light entering section 101 and the light emitting section 102.

The functioning of the lens is now described with reference to FIG. 4. Light is emitted from a light source, such as an LED (not shown) and may adopt a number of paths. Light passing through the sides of the light entering section 101 will having passed through the lens encounter the network of convex facets 124. This causes the light reaching the conical surface of the lens to form multipoint full reflection lights directed toward the light emitting surface section 102. The creation of multipoint full reflection lights decreases the glare index and increases the colour rendering index.

Light encountering the refractive surface 118 on the base of the hole is focussed on the network of refractive surfaces 128 on the surface of the light emitting section 102 of the lens. This improves light efficiency.

Light passing to the network of refractive surfaces 128 on the light emitting section 102 of the lens forms multi point refraction emitting light which also decreases the glare index and increases the colour rendering index.

The inclined surface 120 surrounding the network of refractive surfaces on the light emitting section 102 of the lens facilitates the injection moulding process and improves product consistency.

The total internal reflectance properties of the network of reflective surfaces 24, 124 may be enhanced by creating a mirrored surface on the outer conical of the lens body, or by providing a conical sheath (not shown) of reflective material that fits snugly over the conical outer surface of the lens. This sheath could, for example, have a shiny white or silvered inner surface.

Figure 9:
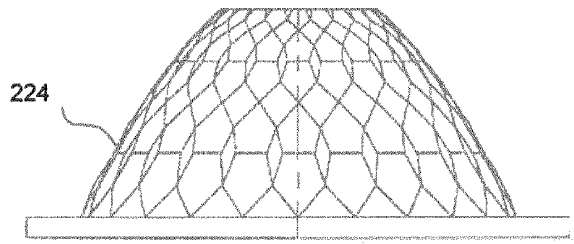
FIG. 9 shows a side view of a third embodiment of a lens according to the present invention.
Figure 10:
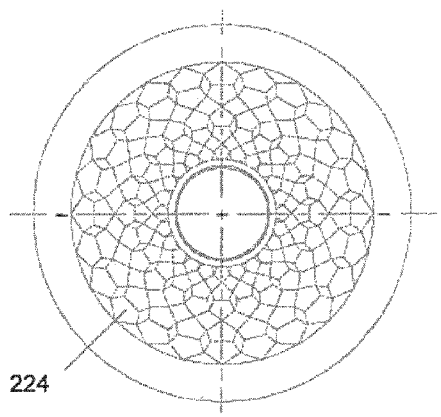
FIG. 10 shows a view from below of FIG. 9.

FIGS. 9 and 10 show a third embodiment of a lens in accordance with the present invention. The third embodiment is of similar section to the second embodiment and shows a further pattern of reflective surfaces 224, the facets comprising a mix of substantially diamond shaped facets and substantially pentagonal facets.

Figure 11:
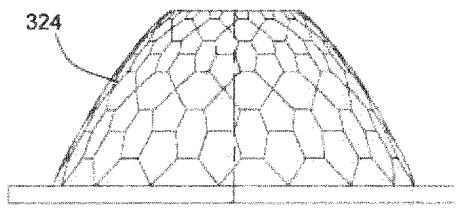
FIG. 11 shows a side view of a forth embodiment of a lens according to the present invention.
Figure 12:
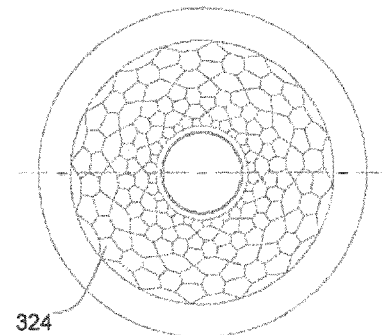
FIG. 12 shows a view from below of FIG. 11.

FIGS. 11 and 12 show a fourth embodiment of a lens in accordance with the present invention. The fourth embodiment is of similar section to the second embodiment and shows a further pattern of reflective surfaces 324, the facets comprising a mix of substantially hexagonal facets and substantially pentagonal facets.

Figure 13:
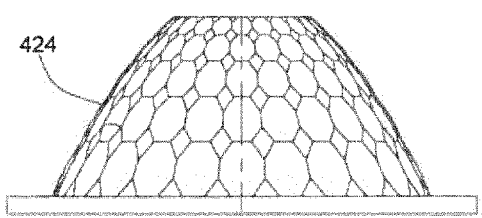
FIG. 13 shows a side view of a fifth embodiment of a lens according to the present invention.
Figure 14:
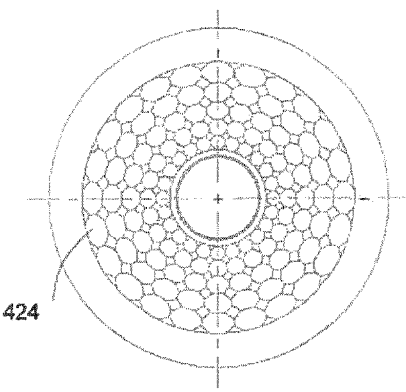
FIG. 14 shows a view from below of FIG. 13.

FIGS. 13 and 14 show a fifth embodiment of a lens in accordance with the present invention. The fifth embodiment is of similar section to the second embodiment and shows a further pattern of reflective surfaces 424, the facets comprising a mix of substantially diamond shaped facets and substantially octagonal facets.

Figure 15:
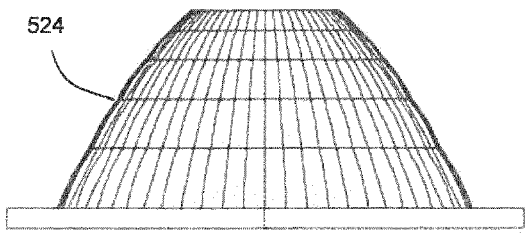
FIG. 15 shows a side view of a sixth embodiment of a lens according to the present invention.
Figure 16:
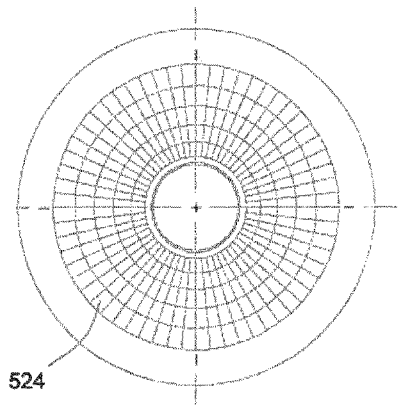
FIG. 16 shows a view from below of FIG. 15.

FIGS. 15 and 16 show a sixth embodiment of a lens in accordance with the present invention. The sixth embodiment is of similar section to the second embodiment and shows a further pattern of reflective surfaces 524, the facets comprising generally rectangular, or more accurately, trapezoidal facets.

Figure 17:
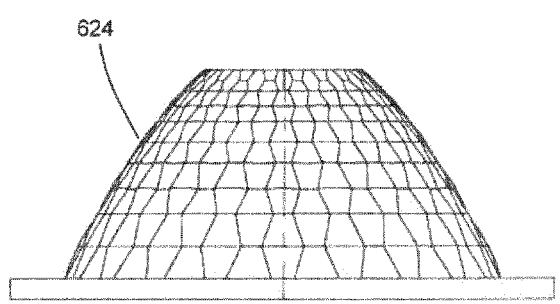
FIG. 17 shows a side view of a seventh embodiment of a lens according to the present invention.
Figure 18:
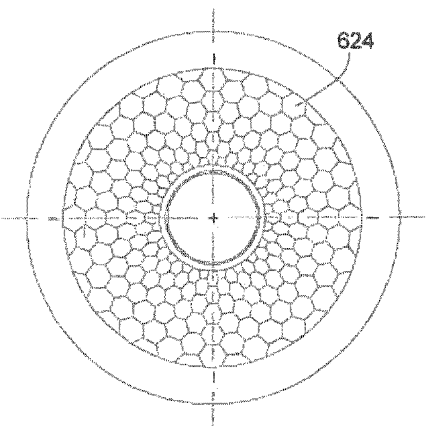
FIG. 18 shows a view from below of FIG. 17.

FIGS. 17 and 18 show a seventh embodiment of a lens in accordance with the present invention. The seventh embodiment is of similar section to the second embodiment and shows a further pattern of reflective surfaces 624, the facets comprising a patterning of substantially polygonal facets.

By way of example, the following table sets out key measurements for typical lenses and provides examples of D1 (with and without a flange) and height (H) measurements, example ratios of D1:H, together with the total number of facets per conical surface (pcs) and the average facet density per square centimeter (psc) on the conical surface (pcs).

| Diameter D1 (with flange) vs Height H (mm) | Diameter D1 without flange | Shape of Reflecting Facet | Number of Facet | Area of reflecting facet | Average Density per centimeter square | Ratio D1 (without flange) to H |
|---|---|---|---|---|---|---|
| φ47.4* Height 14.0 | φ37.6 | Hexagon | Total 640 pcs | 13.78 cm | 46.44 pcs | 2.68 |
| φ47.4* Height 14.0 | φ37.6 | Hexagon | Total 641 pcs | 14.01 cm | 45.75 pcs | 2.68 |
| φ47.6* Height 20.0 | φ38.1 | Triangle | Total 600 pcs | 19.8076 cm | 30.29 pcs | 1.9 |
| φ68.5* Height 18.8 | φ61.49 | Hexagon | Total 777 pcs | 33.98 cm | 22.75 pcs | 3.27 |
| φ68.5* Height 18.8 | φ61.49 | Hexagon | Total 778 pcs | 33.5549 cm | 23.04 pcs | 3.27 |
| φ34.52* Height 12.5 | φ27.29 | Trigon | Total 720 pcs | 8.77 cm | 82.04 pcs | 2.18 |
| φ104.2* Height 20 | φ76.2 | Hexagon | Total 628 pcs | 44.87 cm | 14 pcs | 3.81 |
| φ61.0* Height 16 | φ46.1 | Hexagon | Total 936 pcs | 18.5424 cm | 50.479 pcs | 2.88 |

It will be appreciated from the figures that the density of the facets increases towards the base of the lens and thus towards their proximity with the light source, and accordingly the area occupied by each facet decreases. The smaller the facets the more uniform the light distribution of the light emitted from the front light emitting face of the lens. The generally convex curvature on the external surface of the facets is present on substantially all the facets, even the smallest facets closest to the LED light source.

From the table above it can be seen that the average density of facets in all of the lenses illustrated is greater than or equal to 14 facets per square centimeter, and is usually between 22 and 85 facets per square centimeter. But these are an average, taken over the whole of the conical reflective surface of the lens. It follows therefore that the density of facets will be significantly greater than this figure in the region closest to the LED light source.

It can also be seen from the figures in the above table that the ratio of D1:H is equal to or greater than 1.90 and can be as high as 3.81.

Figure 19:
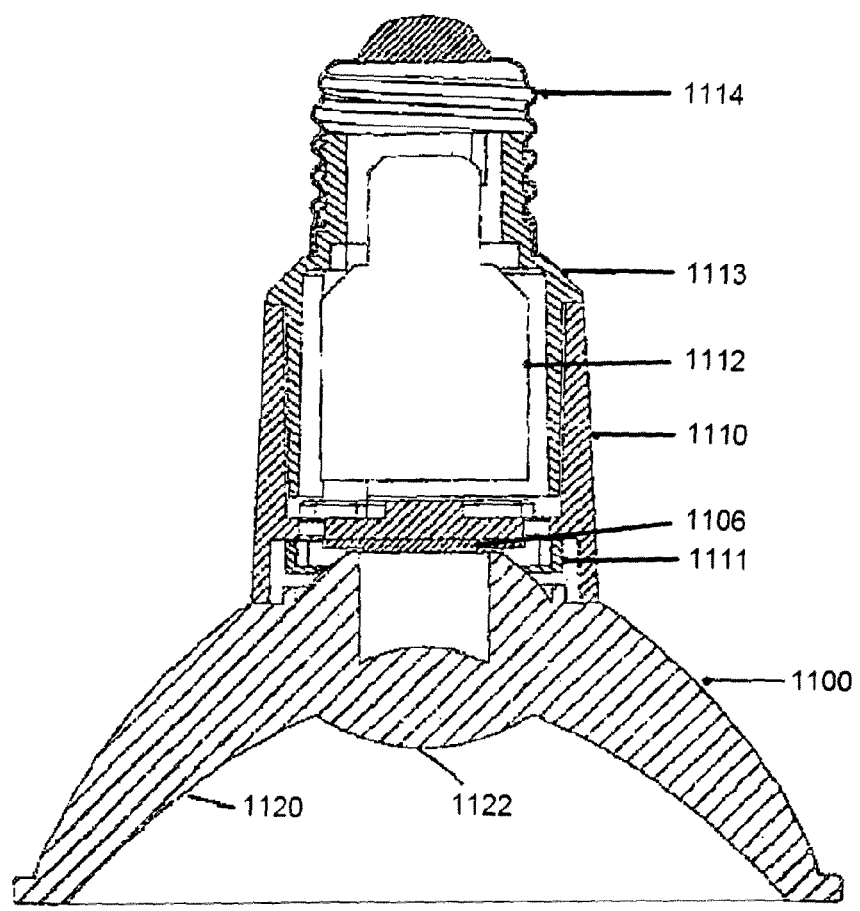
FIGS. 19 and 20 show sectional and exploded component views respectively of a lamp incorporating a lens according to a first aspect of the present invention.
Figure 20:
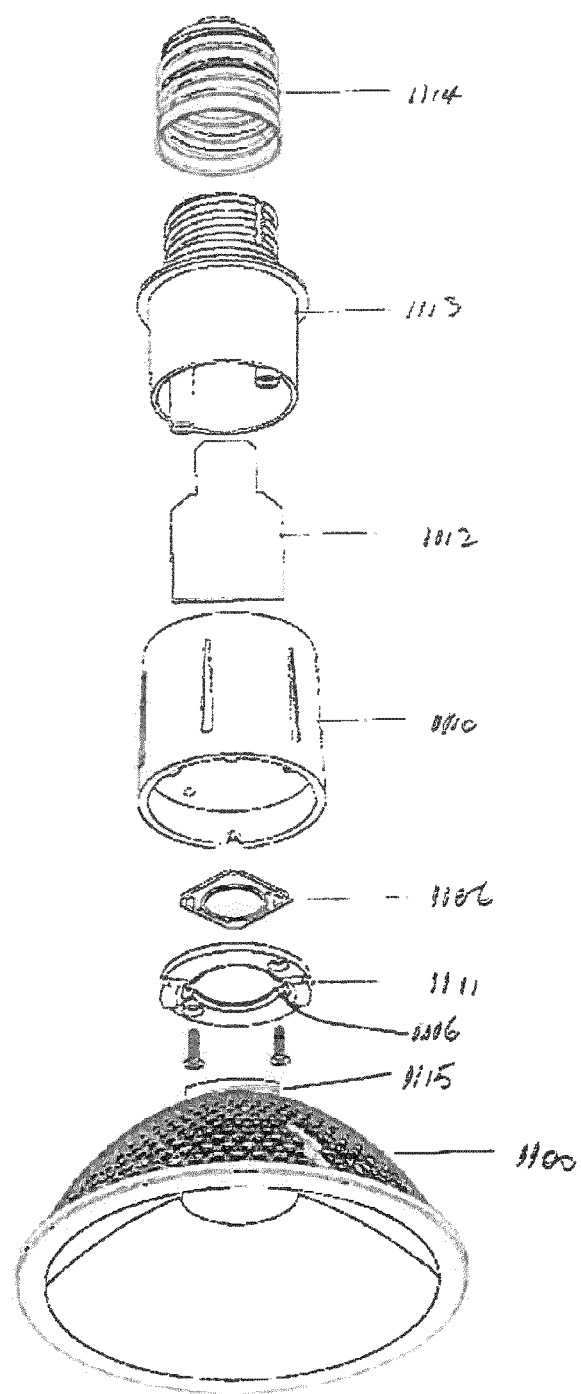

Referring to FIGS. 19 and 20, these illustrate by way of a cross-sectional view and an exploded component diagram respectively a typical lamp incorporating an optical lens according to the present invention. Solid lens 1100 has densely packed convex facets of a substantially triangular configuration on the outer curved surface. These facets are similar to the facets illustrated in FIG. 1 and described above. The lens 1100 is generally similar to the configuration of the lens shown in FIG. 4, although the concave region 1120 in the light emitting front face of the lens is somewhat deeper in profile than that shown in FIGS. 3 and 4 and the convex region 1122 is somewhat more pronounced, having a greater curvature than the ones illustrated in the earlier Figures.

A heat sink 1110 is located behind the lens and an LED or solid state lighting element 1106 is held in thermal contact with the base of the heat sink by means of a cover 1111.

The assembly is completed by a lamp holder 1113, the body of which is hollow and accommodates an LED driver 1112 for the solid state lighting element. The lamp holder in this example terminates in an E27 threaded lamp connecter 1114, although other types of connector could be used as required by the type of fitting that the lamp is required to fit into. The various necessary and conventional electrical connections inside the lamp are not shown for clarity reasons.

The optical lens 1100 is held in place by a twist and lock mechanism whereby two opposing outwardly extending ridges 1115 on the base of the optical lens engage with corresponding recesses 1116 in the cover 1111. Only one of the ridges 1115 is shown in FIG. 20 and it will be seen that this ridge is inclined slightly out of a plane perpendicular to the central vertical axis of the optical lens. Thus rotation of the optical lens with respect to the cover tightens or unscrews the lens, depending on the direction of rotation. The optical lenses in this type of lamp are therefore both replaceable and interchangeable, such that different beam angles can be achieved, depending on the user's requirements.

Although FIG. 20 illustrates a twist and lock mechanism on the base of the lens body, it will be apparent that the twist lock mechanism can be incorporated in any convenient region. For example, the twist lock feature can be located on a front ring or attached using additional locking screws, etc. or it can be incorporated into the lens body itself for attachment/removal.

Figure 21:
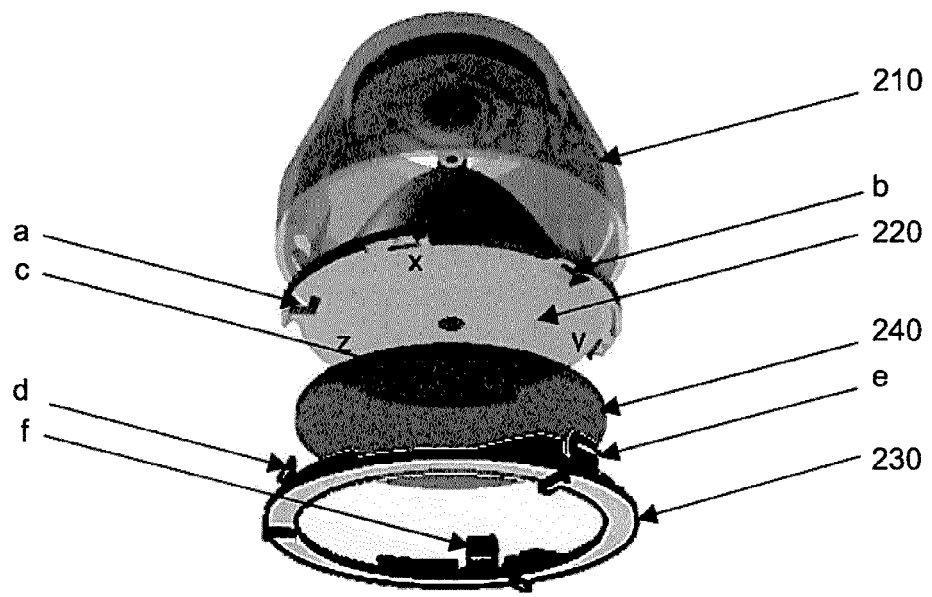
FIG. 21 shows a twist-lock fitment.

An example is shown in FIG. 21, in which lens body 220 comprises a plurality of spring clips disposed around a perimeter of light emitting front face 2 of lens body 220. The spring clips are resilient, and the lens body can therefore be attached to corresponding locking mechanisms in heat-sink/housing 210 by a twist lock action. In FIG. 21, three spring clips x, y and z as shown; designs having more or fewer spring clips can also be used. This allows lens body 220 to be twisted into heat-sink/housing 210 and locked in place.

Lens body 220 can also include slots for receiving tabs on front ring 230. Three such slots a, b and c in lens body 220 and corresponding tabs d, e and f in front ring 230 are shown in FIG. 21. This arrangement means that front ring 230 can retain accessory 240 in place. Accessory 240 may be, for example, a filter or a glass. Front ring 230 clips to lens body 220 only (not the heat-sink/housing 210). These features allow the lens body 220 and the accessory to be easily removed and replaced.

The invention claimed is:

1. An optical lens for an LED integrated light source including an LED light engine, said lens comprising:—
    (i) a lens body having a base where light from the LED light engine can enter the lens, and a light emitting front face, the lens body having a substantially frusto-conical shape having a central vertical axis extending from the base through the light emitting front face, said lens body having a height H between a bottom plane of the base and a front of the light emitting front face, and a cross-sectional dimension D1 across the front of the light emitting front face;
    (ii) a light entering section recessed in the base of the lens body adapted to accommodate an LED light engine, the light entering section having a cross-sectional dimension D2;
    (iii) the outer surface of the frusto-conical lens body between the base and the light emitting front face incorporating a plurality of densely distributed convex facets;
    wherein light from the LED light engine is focussed into a light beam between 15 degrees and 60 degrees about the central vertical axis, and wherein the ratio of D1 to H is greater than or equal to 1.90 and wherein D2 is no greater than 15 mm.

2. The optical lens according to claim 1 wherein the ratio of D1 to H is between 1.90 and 4.00.

3. The optical lens according to claim 1 wherein the ratio of D1 to H is between 1.90 and 3.81.

4. The optical lens according to claim 1 wherein the average density of the densely distributed convex facets on the outer surface of the frusto-conical lens body between the base and the light emitting front face is greater than 14 facets per square centimeter.

5. The optical lens according to claim 1 wherein the average density of the densely distributed convex facets on the outer surface of the frusto-conical lens body between the base and the light emitting front face is between 14 and 85 facets per square centimeter.

6. The optical lens according to claim 1 wherein the number of densely distributed convex facets on the outer surface of the frusto-conical lens body between the base and the light emitting front face is greater than or equal to 600 facets per conical surface.

7. The optical lens according to claim 1 wherein the light entering section in the base of the lens body comprises a blind recess.

8. The optical lens according to claim 7 wherein the blind recess is substantially circular in cross-section.

9. The optical lens as claimed in claim 7 wherein the base of the blind recess incorporates a refractive surface adapted to diffuse or spread light emitted from the LED light engine.

10. The optical lens as claimed in claim 9 wherein the refractive surface takes the form of a plurality of substantially convex facets.

11. The optical lens as according to claim 1 wherein the densely distributed convex facets on the outer surface of the lens body are adapted to reflect light from the LED light engine back into the lens body and ultimately out of the light emitting front face of the lens body.

12. The optical lens according to claim 1 wherein the lens further comprises a flange extending outwardly substantially around a perimeter of the light emitting front face of the lens body.

13. The optical lens according to claim 1 wherein the body of the lens is substantially solid.

14. The optical lens as claimed in claim 13 wherein the lens body is formed from a substantially transparent or translucent plastics material.

15. The optical lens as claimed in claim 13 wherein the lens body is formed from glass.

16. The optical lens according to claim 1 wherein the light emitting front face of the lens body incorporates a recess.

17. The optical lens as claimed in claim 16 wherein the light emitting front face of the lens body is substantially concave.

18. The optical lens as claimed in claim 16 wherein the light emitting front face of the lens body incorporates both concave and convex regions.

19. The optical lens according to claim 1 wherein part or all of the light emitting front face of the lens body incorporates a refractive surface.

20. The optical lens as claimed in claim 19 wherein the refractive surface takes the form of a plurality of substantially convex facets.

21. The optical lens according to claim 1 wherein the base of the lens body incorporates a plurality of cut away portions adapted to accommodate wires supplying electricity to the LED light engine.

22. The optical lens according to claim 1 wherein the lens body comprises a plurality of spring clips disposed around a perimeter of the light emitting front face of the lens body, wherein the lens body can be attached to a corresponding locking mechanisms on a lamp holder by a twist lock action.

23. The optical lens according to claim 22 wherein the lens body includes a plurality of slots for receiving corresponding tabs on a front ring, wherein front ring retains an accessory.

24. A lamp comprising a lamp holder, a solid state lighting element, an LED driver, a heat sink, and an optical lens according to claim 1.

* * * * *